United States Patent [19]

Kian

[11] 3,987,719

[45] Oct. 26, 1976

[54] COOKING UTENSIL

[76] Inventor: Leonard Kian, 17284 Russell, Allen Park, Mich. 48101

[22] Filed: July 23, 1973

[21] Appl. No.: 381,479

[52] U.S. Cl. .................................. 99/422; 99/426; 126/275 R
[51] Int. Cl.² ...................... A21B 3/13; A47J 37/01
[58] Field of Search ...... 99/344, 340, 342, 401–403, 99/410–411, 412–413, 414–415, 416–417, 418–422, 425–426, 428, 444, 446, 447; 126/388–389, 390, 275; 220/69; 249/74

[56] References Cited

UNITED STATES PATENTS

| | | | |
|---|---|---|---|
| 832,274 | 10/1906 | Probst | 126/389 |
| 1,260,720 | 3/1918 | Shattuck | 99/417 |
| 1,316,365 | 9/1919 | Jackson | 220/69 |
| 1,961,756 | 6/1934 | French | 99/428 UX |
| 2,192,600 | 3/1940 | Lurtz | 99/344 UX |
| 2,327,988 | 8/1943 | Bassett | 249/74 |
| 2,413,204 | 12/1946 | Wolff | 126/390 X |
| 2,531,237 | 11/1950 | Steinberg | 126/275 R |
| 2,599,923 | 6/1952 | Kraemer et al. | 126/275 R |
| 3,035,568 | 5/1962 | Dama et al. | 126/275 R |

FOREIGN PATENTS OR APPLICATIONS

| | | | |
|---|---|---|---|
| 963,905 | 1/1950 | France | 126/390 |
| 384,141 | 11/1923 | Germany | 99/417 |
| 118,203 | 12/1926 | Switzerland | 99/417 |
| 141,835 | 10/1930 | Switzerland | 99/417 |
| 11,297 | 6/1902 | United Kingdom | 126/390 |
| 824,727 | 12/1959 | United Kingdom | 99/417 |

*Primary Examiner*—Robert W. Jenkins
*Assistant Examiner*—Arthur O. Henderson
*Attorney, Agent, or Firm*—Price, Heneveld, Huizenga & Cooper

[57] ABSTRACT

A cooking utensil including pan, base, and cover elements, each formed with annular outwardly extending flanges or lips about its periphery for cooperative stacking engagement to provide a portable oven or the like. The utensil is particularly useful for the baking of pizza or the like on a stove top, an electric hot plate, or over a camp fire. The base and pan elements have a specially configured construction including a plurality of openings in the sides thereof such that when stacked together, they cooperatively provide a heat-deflection chamber to direct the heat from a source below the base into an oven chamber formed between the pan element and its matching cover. The pan element also includes an annular trough or ridge to hold additional batter which, when heated, rises to form a thickened edge crust about the pizza.

7 Claims, 5 Drawing Figures

3,987,719

COOKING UTENSIL

BACKGROUND OF THE INVENTION

This invention relates to a portable oven or as is sometimes called a stove-top oven. Ovens of this type are adapted for use on a source of heat and generally include a base having special orifices therein to direct the heat into an upper cavity or oven chamber in which the article to be cooked is placed. One example of an oven of this general type is shown in Kramer et al, U.S. Pat. No. 2,599,923 wherein a base assembly having an integrally formed plate is adapted for positioning on the surface burner of a stove. A cover or hood placed over the base provides an oven chamber. A plurality of openings in the base allow heat to flow through the base and up into the chamber. Other examples of such structures are also shown in U.S. Pat. Nos. 427,519 and 1,732,554.

In ovens of the type shown in the aforenoted patents, the article to be cooked usually must be wrapped as in aluminum foil or placed on a separate container within the oven chamber requiring additional implements for use. In some cases, the foodstuff may be cooked directly on the base itself. However, cleaning of the base then becomes a problem. If, for example, it is dipped in water, the base will fill and be difficult to dry. If a separate container is placed on the base, heat distribution is adversely effected and food may burn or scorch.

SUMMARY OF THE INVENTION

The present invention improves upon ovens of the general type discussed and overcomes the difficulties encountered with their use. In addition, the present invention provides a separable, easily cleaned assembly including a base, pan, and top. The pan serves a dual purpose in providing a surface upon which the article is cooked and also cooperates with the base to provide a heat-convection chamber. In another aspect of the invention, a special trough or ridge is formed about the cooking surface of the plate to hold additional batter which, during the baking of a pizza crust, will rise to form a thickened edge portion thereon. The base and the pan cooperatively provide a heat convector to direct heat into an oven cavity defined by the pan and cover members. The article to be cooked may be placed directly on the pan which may be easily removed for cleaning.

The many objects and advantages of the present invention will be readily appreciated by those skilled in the art as the invention becomes better understood by reference to the following detailed specification and to the accompanying drawings illustrating a preferred embodiment of the invention.

DESCRIPTION OF THE PREFERRED EMBODIMENT

Figure 1:
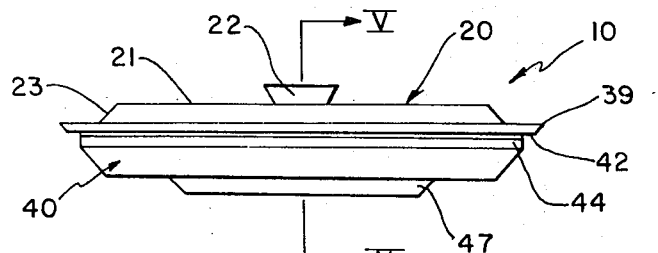
FIG. 1 is a side view of the cooking utensil of the present invention.

In the drawings, the cooking utensil generally illustrated by the numeral 10 includes a cover 20, a pan 30 which forms a cooking surface, and a base 40 to support the pan above a heating surface and which cooperates with the pan to form an interior heating chamber 14. The cover 20 and pan 30 cooperatively define an oven chamber 16 (FIG. 5).

Figure 5:
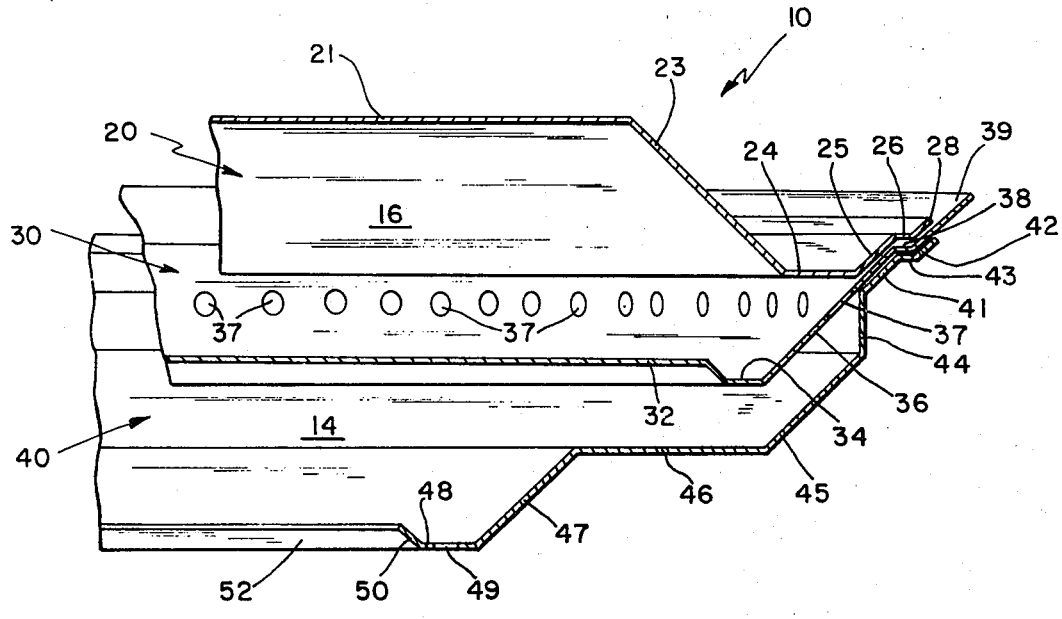
FIG. 5 is a fragmentary, cross-sectional view taken along the plane V—V of FIG. 1 illustrating the cover, pan and base in stacked, assembled relationship.
Figure 2:
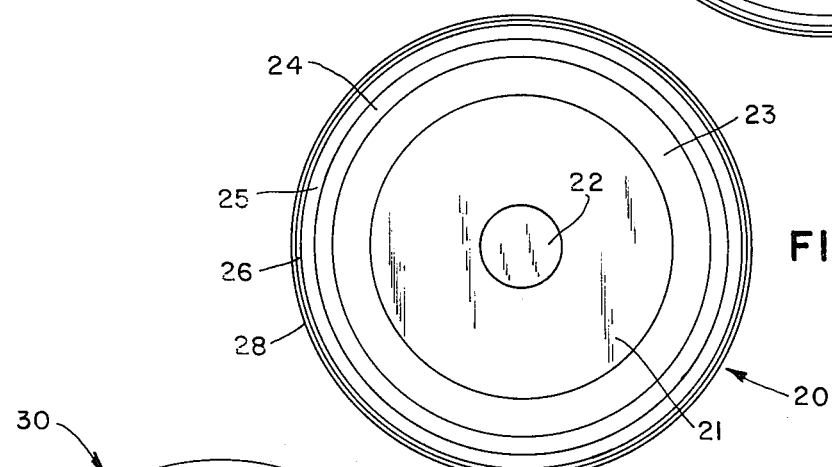
FIG. 2 is a top plan view of the cover member.

The cover 20 illustrates in FIGS. 1, 2, and 5 is disc-shaped and includes a flat planar top surface 21 upon which a handle 22 is generally centrally located. Side walls 23 flare radially outwardly and downwardly from top surface 21. At the lower portion of side wall 23, a radial flat wall 24 is formed extending outwardly and generally parallel to top surface 12. The flat wall in turn flares upwardly and outwardly in a series of steps forming first and second sealing walls 25 and 26 and an upwardly flaring sealing lip 28 forming the outer periphery of the cover.

Figure 3:
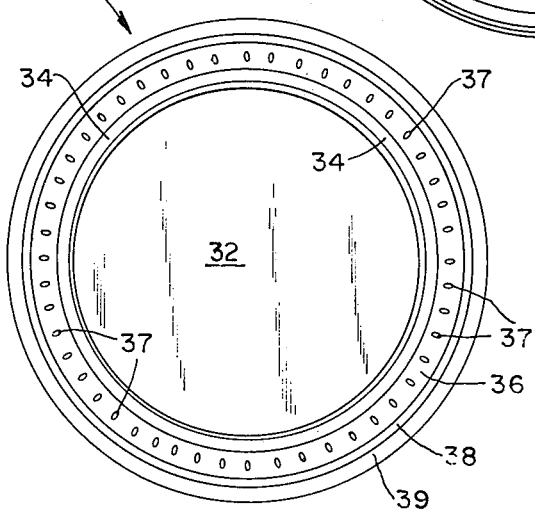
FIG. 3 is a top plan view of the pan forming the cooking surface.

Referring additionally to FIG. 3, the pan or cooking surface is also disc-shaped and includes a slightly raised bottom surface 32 having an annular trough or channel 34 defining its outer boundary. Annular side wall 36 extends outwardly and upwardly from trough 34, terminating in an annular ledge 38. The ledge, as will be more fully described hereinafter, serves as a sealing and support surface for cover 20 and base 40. A peripheral rim 39 extends upwardly and outwardly from the ledge. Rim 39, as shown in FIG. 5, has a length somewhat greater than that of sealing lip 28 of cover 20 and is adapted for engagement therewith. Rim 39 also serves as a convenient handle by which the pan can be removed from base 40. A series of equally spaced apertures 37 are disposed in side wall 36 and extend completely around the pan.

Figure 4:
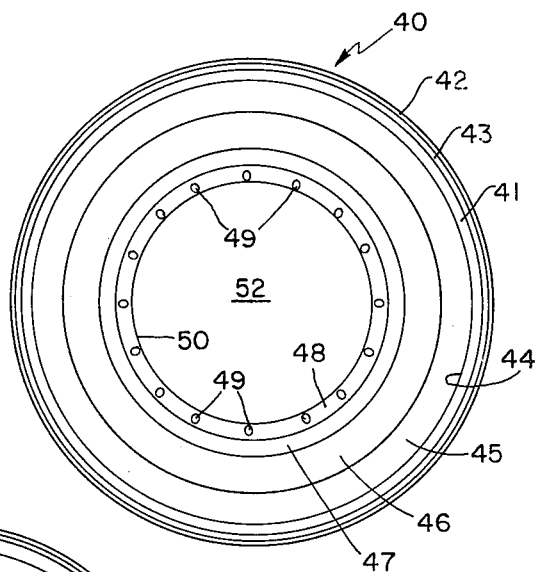
FIG. 4 is a top plan view of the base.

The base illustrated in FIGS. 4 and 5, like cover 20 and pan 30, is disc-shaped and includes a plurality of downwardly depending side walls terminating toward the center in an inwardly directed annular foot 48 providing a support surface to hold the assembly over a heat source. The outermost upper edge of the base includes an outwardly, upwardly extending flange 42. At its lower end, flange 42 flows inwardly generally parallel to foot 48, forming a lip 43 for engagement with ledge 38 on pan 30. Flange 42 and lip 43 are also adapted to receive sealing wall 26 and lip 28 of cover 20 when pan 30 is removed as will be more fully explained hereinafter. Continuing inwardly, the side wall of base 40 further includes a first, inwardly and downwardly flowing angular wall section 41 which turns downwardly forming an outer, generally vertical wall section 44 connecting to a second inwardly tapering wall 45, a lower ledge or intermediate wall 46, and a third inwardly tapering wall 47. The third inwardly tapering wall 47 terminates in the previously described foot 48. Foot 48 includes an inwardly and upwardly directed lip 50 defining a central opening 52 in the center of the lower part of the base. Central aperture 52 is provided to allow the heat from a source, as a surface burner of a stove, to enter heating chamber 14. Additional vent holes 49, positioned about foot 48, allow additional direct heat to circulate within chamber 14.

When assembled in stacked relationship as shown in FIG. 5, sealing wall 26 and sealing lip 28 are positioned on ledge 38 and peripheral rim 39 of pan 30. These elements in turn are supported above a heat source on lip 43 and outer flange 42 of base 40. Heat flow from the source is through the base central aperture 52 and openings 49 into heat convection chamber 14. Heat in chamber 14 flows upwardly along walls 47, 46, and along walls 45 and 44 spaced from wall 36 and passes through apertures 37 into oven chamber 16 defined by pan 30 and cover 20. An article placed on the pan, thus, will be subjected to heat from both the bottom surface 32 of pan 30 and also from the heat circulating within the oven chamber 16.

As previously mentioned, the pan is adapted for the convenient cooking of pizza and the like on a stove top, an electric hot plate, over a camp fire, or on an outdoor grill or the like. Trough 34 accommodates additional quantities of pizza dough placed on surface 32 and trough 34. Because of the unique configuration of the assembly, intermediate wall 46 and wall 45 are in general alignment with trough 34 and wall 36 when the cooking utensil is assembled. The flat wall 24 of cover 20 is also positioned directly above trough 34 adjacent apertures 37. Intermediate wall 46, therefore, acts as a heat guide forcing hot air around the bottom surfaces and sides of trough 34 to apply additional heat to the thickened edge crust portion of the pizza. Flat wall 24 of cover 20 is also positioned directly above trough 34 adjacent apertures 37 to concentrate additional heat in oven chamber 16 about the thickened edge portion. Baking thereof will be accomplished in the same time that the thinner central portion resting on cooking surface 32 will be completed. Heat about the trough in oven chamber 16 also causes the extra batter to rise slightly above the batter baking on the base thereby forming a rim about the pizza.

In the preferred embodiment of the invention, it has been found that the cooking utensil can be economically fabricated from stamped sheet metal having a gauge of about 0.064 of an inch. The flanges, lips, ridges, and rims, etc. give a material of this thickness sufficient rigidity. Preferably, the cooking surface, trough, and at least a portion of the side wall 36 of pan 30 are coated with a non-stick finish to prevent material cooked thereon from sticking. Teflon coatings and other materials well known to those skilled in the art may be satisfactorily utilized. In the preferred embodiment, the pan and base are formed of 14-gauge sheet aluminum while the cover is formed from 18-gauge material. The material and its thickness may be varied, of course, as required.

In one embodiment of the invention for baking a 10-inch pizza, the pan 20 has a diameter of 10 inches across the bottom and trough 34 to side walls 36 adjacent the trough. The diameter across peripheral rim 39 is 12-½ inches. In a preferred embodiment, 48 equally spaced apertures 37 are spaced in side wall 36 although the number may vary depending upon the size of the cooking utensil. The uppermost edge of rim 39 extends approximately 1-¼ inches from the lowermost surface of trough 34. While the dimensions are not particularly critical, it has been found that an assembly having a total stacked height, excluding the handle, of from 2-¾ to 4 inches works exceptionally well for the preparation of low silhouette foods such as pizza, steaks, and the like. In actual tests, pork chops, hamburgers, and frankfurters have been prepared with considerably less smoke and odor and in approximately one-half of the time normally required.

PIZZA EXAMPLE

In operation, a conventional prepackaged pizza mix can be used. However, a convenient recipe which gives excellent results and the steps for preparing a pizza in the novel utensil of the invention on an electric range are as follows:

Step 1 — Batter Mix

Mix ⅔ Cup all-purpose, bleached, presifted flour with 2 level tablespoons of cornstarch, 1 teaspoon sugar, ½ teaspoon salt and 2 teaspoons baking powder. To this mixture add ½ Cup water plus 1½ teaspoons cooking oil, blending thoroughly until smooth. Let batter stand approximately 5 minutes or until batter bubbles and rises.

Step 2

While batter rises, place cover 20 on base 40 and position on medium high burner to preheat.

Step 3

Stir batter again and pour slightly off-center of cool bake pan 30. Holding the bake pan 30 slightly tilted until the batter slowly flows toward the trough. Turn the pan until the batter covers the entire pan bottom and fills the entire trough avoiding, of course, allowing the batter to flow into the vent holes. Removing the cover, place the bake pan on the base and replace the cover baking for 9 minutes. At the end of this time, remove the cover and place desired sauces, cheese and other toppings on the pizza dough. Allow 4 minutes for the topping procedure. Replace cover and bake an additional 7 minutes. The cover may then be removed and the pizza slid onto a cutting board or platter where it may be cut and served.

From a reading of the foregoing description, it will be readily appreciated by those skilled in the art that the cooking utensil of the present invention can be easily fabricated from relatively inexpensive materials. It is light in weight, easily packaged, and because of its novel stacked construction, is easily disassembled for cleaning. Although a specific embodiment of the invention has been described and illustrated in detail, those skilled in the art will also readily appreciate that many other modifications can be made in light of the foregoing disclosure. Accordingly, these modifications are to be considered as included in the appended claims unless these claims by their language expressly state otherwise.

The embodiment of the invention in which an exclusive privilege property is claimed is defined as follows:

1. A cooking utensil adapted for cooking a pizza from a batter comprising, in combination:

a first member having a surface thereon for receiving said batter, said surface being generally circular in configuration and having a central imperforate planar area, and an upwardly and outwardly directed peripheral side wall, and supporting means extending from and formed adjacent the perimeter of said side wall; an annular recess surrounding said planar area at the juncture of said imperforate planar area and said side wall, said recess providing a thickened quantity of said batter around the periphery of said pizza to form a thickened edge crust on the pizza during cooking;

a circular base member having a lower surface thereon for supporting said base member and first member above a heating surface; means defining a central opening in said lower surface to allow the admittance of heat directly therethrough; a peripheral side wall extending outwardly and upwardly from said lower surface, said side wall terminating in an outer peripheral flange, said flange being adapted to receive said supporting means on said first member, said first member being supported above said lower surface and forming a heating chamber within said base member when said supporting means is so received;

a cover member, said cover member having an annular peripheral lip thereon adapted for sealing engagement with said supporting means on said first member; said cover member and said first member cooperatively forming an oven chamber above said heating chamber;

said first member side wall being spaced from said outwardly and upwardly extending side wall on said base member when said utensil is assembled and having a plurality of spaced openings formed therethrough whereby heat is transferred from said heating chamber through said openings into said oven chamber above said planar surface area for cooking batter thereon.

2. The apparatus as defined in claim 1 and further including said supporting means having means extending outwardly therefrom for lifting said first member from said base, said lifting means extending outwardly from said cover member when said utensil is assembled.

3. The combination of claim 2 wherein said base member side wall includes first and second upwardly directed side wall portions and an intermediate side wall portion between said side wall portions, said intermediate wall portion extending generally parallel to said lower surface and to said first member supporting surface, said annular recess and said intermediate wall portion being in general vertical alignment when said base and said first member are stacked.

4. The combination of claim 3 wherein said cover member includes a flat planar top surface, a radially outwardly and downwardly directed side wall extending therefrom, said radially outwardly and downwardly directed side wall terminating in said peripheral lip; at least a portion of said radially outwardly and downwardly directed side wall being positioned in a plane generally parallel to said top surface.

5. The combination of claim 2 wherein said base member peripheral side wall includes at least an angularly upwardly directed portion and a radially outwardly directed portion, said annular recess overlying one of said portions when said base and said first member are stacked.

6. A cooking utensil adapted for cooking a pizza from a batter comprising, in combination:

a first member having a cooking surface thereon for receiving said batter, said cooking surface having a central imperforate planar area, and an upwardly and outwardly directed peripheral side wall surrounding said central imperforate planar area and supporting means formed adjacent the perimeter of said side wall; a recess surrounding said central imperforate planar area at the juncture of said central imperforate planar area and said side wall, said recess providing a thickened quantity of said batter around the periphery of said pizza to form a thickened edge crust on the pizza during cooking;

a base member having means thereon for supporting said base member over a heating surface; a peripheral side wall extending outwardly and upwardly from said base member supporting means, said base member side wall and said base member supporting means defining a central opening through said base member to allow the admittance of heat thereinto, said base member side wall terminating in an outer peripheral flange, said flange being adapted to receive said supporting means on said first member, said first member being supported above said lower surface and forming a heating chamber below said first member cooking surface when said supporting means is so received;

a cover member, said cover member having a peripheral lip thereon adapted for sealing engagement with said supporting means on said first member; said cover member and said first member cooperatively forming an oven chamber above said heating chamber and first member cooking surface; and means defining a plurality of spaced openings through said first member peripheral side wall above said planar area whereby heat is transferred from said heating chamber through said openings and into said oven chamber above said cooking surface.

7. The cooking utensil of claim 6 wherein said first member, said cooking surface, said base member and said cover member are generally circular in configuration.

* * * * *